No. 729,073.       Patented May 26, 1903.

UNITED STATES PATENT OFFICE.

MAX KUGEL, OF WIESDORF, GERMANY, ASSIGNOR TO FARBENFABRIKEN OF ELBERFELD CO., OF NEW YORK, N. Y., A CORPORATION OF NEW YORK.

ANTHRACENE DYE.

SPECIFICATION forming part of Letters Patent No. 729,073, dated May 26, 1903.

Application filed February 17, 1903. Serial No. 143,863. (No specimens.)

*To all whom it may concern:*

Be it known that I, MAX KUGEL, doctor of philosophy, chemist, residing at Wiesdorf, near Cologne, Germany, (assignor to the FARBENFABRIKEN OF ELBERFELD CO., of New York,) have invented a new and useful Improvement in New Anthracene Dye; and I hereby declare the following to be a clear and exact description of my invention.

My invention relates to the manufacture of new dyestuff sulfonic acids of the anthracene series by causing sulfonating agents to act on the anthraquinone derivatives described in my application for Letters Patent bearing the Serial No. 134,125, filed December 6, 1902. The said bodies, which are most probably oxazin derivatives, are obtained by causing oxidizing agents to act on such alpha-alphyl-amidoanthraquinones or derivatives thereof as contain a hydroxy group in ortho position to the alphylamido group, such as 1-toluido-2-oxyanthraquinone, 1-anilido-2-oxy-3-bromo-anthraquinone, 1-anilido-2-4-dioxyanthraquinone, 1-5-dianilido-2-4-6-8-tetraoxyanthraquinone, or the like. The new dyestuff sulfonic acids obtained by the sulfonation of these bodies are in the shape of their alkaline salts colored powders, which are soluble in hot water with from violet to greenish-blue color. They dye unmordanted wool from violet to greenish blue and chrome-mordanted wool from violet to green shades.

In carrying out the process practically I can proceed as follows, the parts being by weight: Ten parts of the anthraquinone derivative obtainable by oxidation of 1-paratoluido-2-4-dioxyanthraquinone, which body is most probably an oxazin derivative having the following formula:

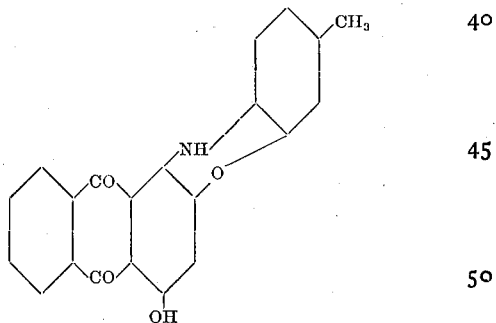

are mixed with two hundred and fifty parts of fuming sulfuric acid, (ten per cent. $SO_3$.) The resulting mixture is then heated to about from 70° to 80° centigrade until a test portion is clearly dissolved by hot water. The reaction mass is poured into about two thousand parts of ice-water. The resulting precipitate is filtered off, washed with a solution of common salt, and dried.

When dry and pulverized, the new coloring-matter is a dark-blue powder, which is soluble in water with a blue color and nearly insoluble in dilute acids. By concentrated sulfuric acid (of 66° Baumé) it is dissolved with a bluish-green color. It dies unmordanted wool blue and chrome-mordanted wool green shades.

The preparation of the other sulfonic acids is carried out in an analogous manner.

Having now described my invention and in what manner the same is to be performed, what I claim as new, and desire to secure by Letters Patent, is—

1. The herein-described new dyestuff sulfonic acids, obtainable by sulfonating the anthraquinone compounds, being most probably oxazin derivatives, which can be prepared by causing oxidizing agents to act on such alpha-alphylamidoanthraquinones as contain a hydroxy group in ortho position to the alphylamido group, which dyestuff sulfonic acids are, in the shape of their alkaline salts, colored powders soluble in hot water with from violet to greenish-blue color; dyeing unmordanted wool from violet to greenish blue and chrome-mordanted wool from violet to green shades, substantially as hereinbefore described.

2. The herein-described new dyestuff sulfonic acid, obtainable by sulfonating the anthraquinone compound, being most probably an oxazin derivative, which has the above-given formula, which dyestuff sulfonic acid is, when dry and pulverized, in the shape of its sodium salt, a dark-blue powder soluble in water with a blue color and nearly insoluble in dilute acids, being dissolved by concentrated sulfuric acid of 66° Baumé with a bluish-green color, dyeing unmordanted wool blue and chrome-mordanted wool green shades, substantially as hereinbefore described.

In testimony whereof I have signed my name in the presence of two subscribing witnesses.

MAX KUGEL.

Witnesses:
OTTO KÖNIG,
J. A. RITTERSHAUS.